Aug. 23, 1938.     B. R. ELLS     2,127,557
BRAKE
Filed Oct. 7, 1936     3 Sheets-Sheet 1
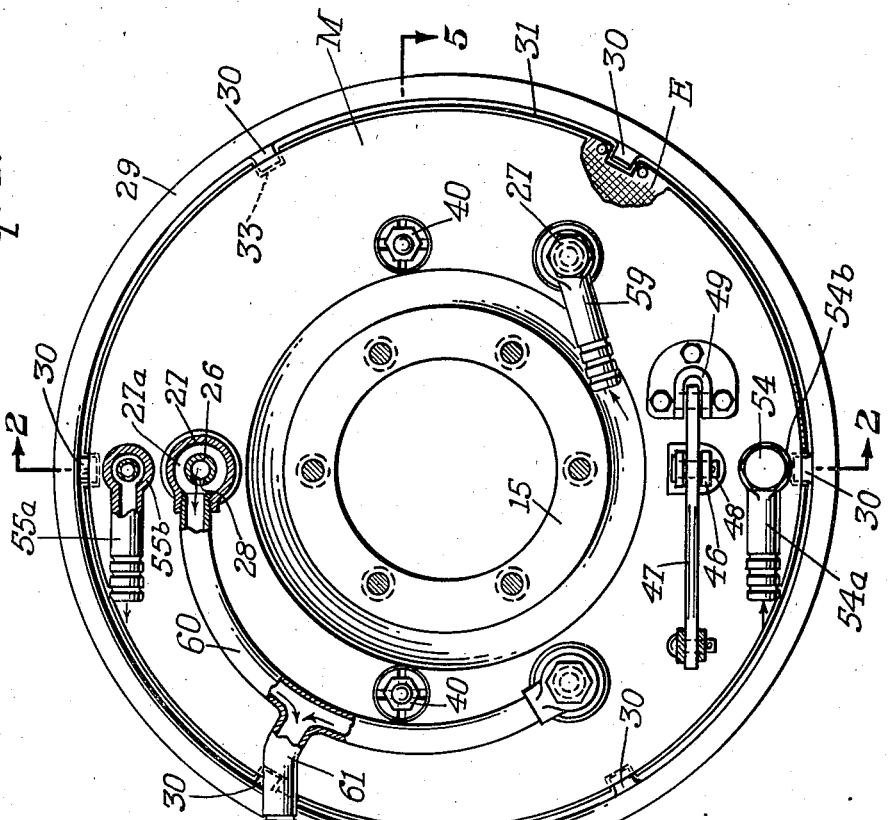
INVENTOR.
Burdick R. Ells
BY
Edwin D. Jones,
ATTORNEY.

Aug. 23, 1938.   B. R. ELLS   2,127,557
BRAKE
Filed Oct. 7, 1936   3 Sheets-Sheet 2

INVENTOR.
Burdick R. Ells
BY
ATTORNEY.

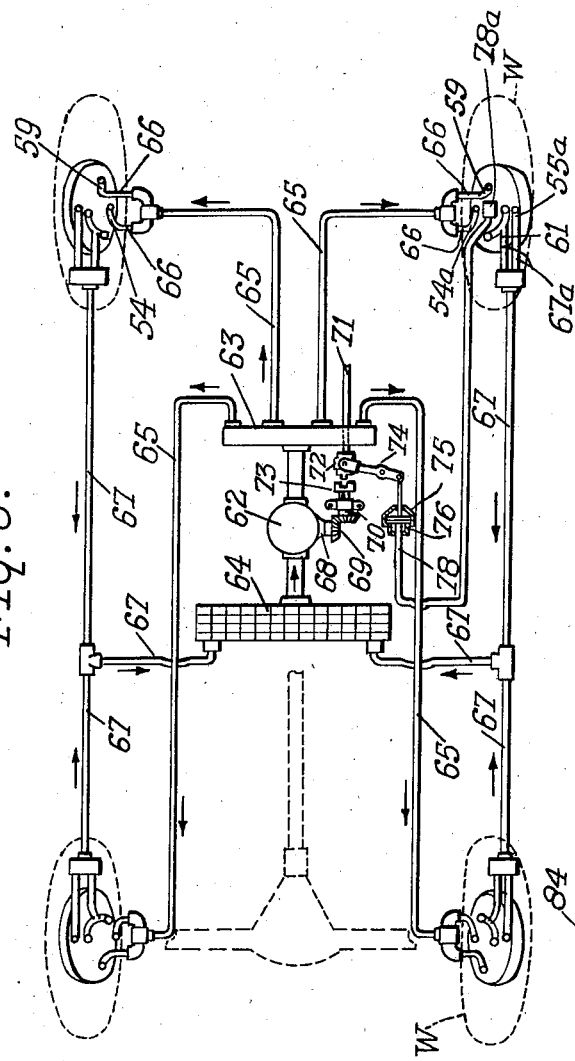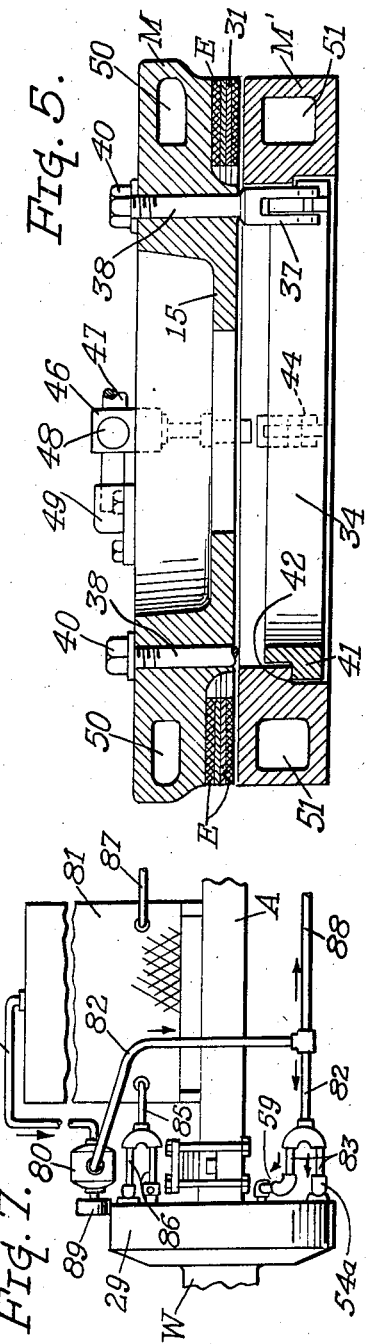

Patented Aug. 23, 1938

2,127,557

UNITED STATES PATENT OFFICE 2,127,557

BRAKE

Burdick R. Ells, Los Angeles, Calif., assignor to Harry F. Langlois and Herbert N. Langlois, individually and as copartners doing business as Langlois Bros.

Application October 7, 1936, Serial No. 104,467

7 Claims. (Cl. 188—264)

My invention relates to brakes and more particularly to brakes for trucks, trailers, busses and the like where the conditions of brake operation are so severe as to cause rapid heating and destructive burning of the brake liners as well as the resultant distortion of the drum and other metal parts of the brake.

It is a purpose of my invention to provide in a brake, means by which the brake parts are subjected to the cooling action of water or other heat-dissipating fluid in a manner to maintain the brake parts at relatively low temperatures and thereby prevent overheating thereof even when the brake is continuously applied for protracted periods.

It is also a purpose of my invention to provide a wheel brake having chambers therein through which water is circulated by operation of a pump, and where automatic means is provided for rendering the pump active only when the temperature of water in the chambers rises above a predetermined degree, and to maintain the pump in operation for such time after the water temperature is reduced to insure complete cooling of the brake.

I will describe only one form of brake, and two forms of pump operating and control means, each embodying my invention and will then point out the novel features thereof in claims.

In the accompanying drawings:

Fig. 1 is a view showing in side elevation one form of brake embodying my invention with the bolts by which the brake is secured to the axle, in section.

Fig. 2 is a vertical sectional view taken on the line 2—2 of Fig. 1.

Figure 4:
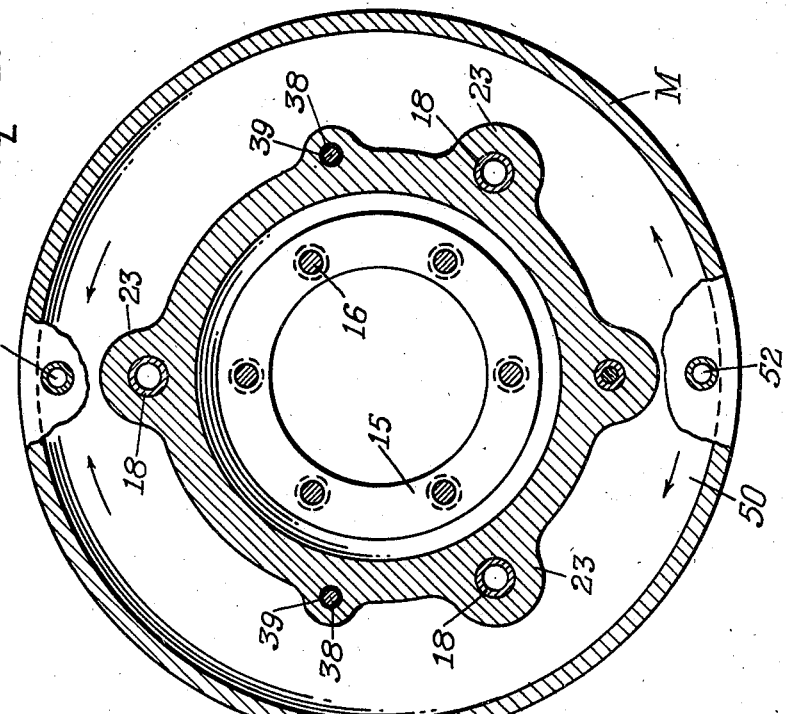
Figure 3:
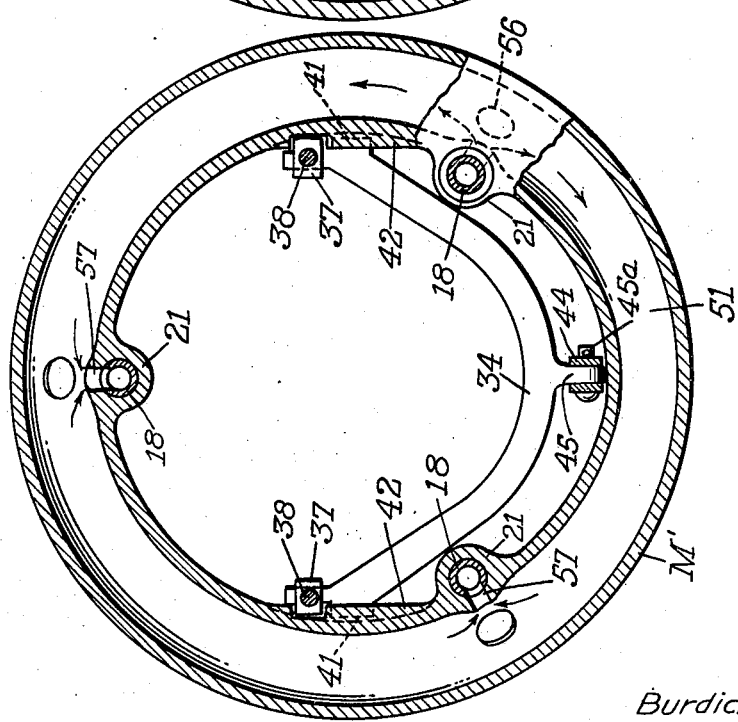

Figs. 3 and 4 are vertical sectional views taken on the lines 3—3 and 4—4, respectively of Fig. 2.

Fig. 5 is a horizontal sectional view taken on the line 5—5 of Fig. 1, with the drum omitted.

Fig. 6 is a view showing in plan and somewhat in perspective four brakes constructed in accordance with my invention for the respective wheels of a truck, and one form of water circulating means applied to the brakes.

Fig. 7 is a view showing in front elevation one trailer brake constructed in accordance with my invention and a water circulation means therefor.

Referring specifically to the drawings, and particularly to Figs. 1 and 2, my invention in its present embodiment essentially consists of a rotor adapted to be fixed to a vehicle wheel W for rotation therewith, and a stator having parts movable to have braking engagement with the rotor to restrain rotation thereof in effecting braking of the wheel.

The stator includes a brake pressure applying member M which is of annular form and provided on its inner periphery with an annular flange 15 which is secured by bolts 16 to the flange 17 of an axle A. This axle may constitute the axle housing for the rear axle of a truck, the front axle of a truck, or the dead axle of a trailer. The stator also includes an inner brake-pressure applying member M' which is likewise of annular form and supported concentrically on the outer member M to move axially toward and away from the latter but not to rotate relative thereto. To support the inner member in this manner three short lengths of pipe 18 are secured at their closed ends (Fig. 2) in bosses 21. These pipes are loosely fitted in openings 22 in bosses 23 of the outer member M.

Expansible springs 24 one for each of the pipes 18 are mounted on the pipes and disposed in pockets 25 of the outer member M, all as clearly illustrated in Figs. 2 and 4. These springs 24 serve to urge the inner member M' to an innermost position defined by tubular cap screws 26 which abut the outer side of the bosses 23. These screws 26 are threaded into the pipes 18, and threaded on the screws are hubs 27 having radial openings 27a which communicate with openings 28 in the screws.

The rotor of the brake includes a drum 29 in which the stator is adapted to be received, and this drum is provided interiorly thereof with ribs or keys 30 arranged at circumferentially spaced intervals, as best shown in Fig. 1. The rotor also includes a brake pressure receiving element E which is made up of two flat and annular plates 31 to the outside sides of which are riveted liners 32 of any suitable material. The peripheries of the plates 31 are formed with recesses 33 in which the ribs 30 are received, thus providing splined connections between the drum and the element by which the latter is caused to rotate with the drum and yet can be moved laterally within the drum. The mounting of the element E, also, is such that it is interposed between the members M and M' with the liners 32 adapted to have braking contact with the confronting sides of the members.

For actuating the inner member M' to cause such member to coact with the outer member M to have braking engagement with the element E, the following mechanism may be provided: As best shown in Figs. 2, 3 and 5, a U-shaped yoke 34 is fulcrumed at its upper ends by pins 35 engaging within recesses 36 of the yoke and extending through clevises 37 fixed on the inner ends of a pair of rods 38. These rods 38 are loosely fitted in and extend through openings 39 in the outer member M, the outer ends of the rods carrying nuts 40 which limit movement of the rods inwardly.

Just beneath the fulcrumed ends of the yoke 34 rounded lugs 41 engage shoulders 42 on the inner member M' so that when the yoke is swung outwardly in a counter-clockwise direction as when viewed in Fig. 2, the inner member will be moved toward the outer member to thereby cause the two members to have braking engagement with the element E. Such actuation of the yoke is effected through the medium of a rod 43 threaded in a clevis 44 pivotally connected to an ear 45 on the yoke 34 by a pin 45ᵃ. The rod 43 carries a nut 43ᵃ for locking the rod in adjusted position in the clevis 44. The outer end of the rod is provided with a clevis 46 in which is pivoted a lever 47 by means of a pin 48.

As shown in Fig. 2, the elements just described, with the exception of the lever 47, are movable through suitable openings in the members M and M', the lever being fulcrumed on a bracket 49 secured to the outer side of the outer member M. This lever is adapted to be connected to any suitable mechanism (not shown) by which it may be pulled outwardly from the brake to effect actuation of the yoke in the manner previously described. Such operation of the yoke is against the tension of the several springs 24, and thus when pull is no longer exerted upon the lever, the springs return the inner member M' to a non-braking position with respect to the element E.

As shown in Figs. 2, 3, and 4 the members M and M' are formed with annular chambers 50 and 51, respectively, through which water or any other cooling fluid is adapted to be circulated. The member M is provided with an inlet 52 at its bottom and an outlet 53 at its top, both communicating with the chamber 50 and having threaded therein tubular cap screws 54 and 55 respectively, to which inlet and outlet pipes 54ᵃ and 55ᵃ are respectively connected by hubs 54ᵇ and 55ᵇ formed integral therewith. The member M' is provided with one inlet port 56 and two outlet ports 57 (Fig. 3). In each instance the respective pipe 18 (Fig. 2) communicates with the respective port through a port 58 so that the chamber 51 is placed in communication with the three pipes 18.

In the instance of the cap screw 27 for one pipe 18, an inlet pipe 59 is screwed into the latter. In the instance of the cap screws for the other pipes, the opposite ends of a pipe 60 are screwed thereinto. The pipe 60 is of Y-form to provide a common outlet pipe 61. The purpose in providing two outlets for the chamber 51 is to effect a more free circulation of water through the chamber in order to dissipate that excess heat to which the inner member M' is subjected by reason of it being substantially housed within the drum 29.

For the purpose of circulating water through the four brakes of a motor truck or bus where each brake is constructed in accordance with my invention, I provide, as illustrated in Fig. 6, a rotary pump 62 connected at its outlet side to a header 63, and at its inlet side to a radiator 64. Through tubes 65 and branch tubes 66 the header 63 is connected to the inlet pipes 54ᵃ and 59 to place the chambers 50 and 51 of each brake in communication with the header, the radiator being provided for the purpose of distributing water evenly to all brakes. Return pipes 67 and branch pipes 67ᵃ connect the outlet pipes 55ᵃ and 61 to the radiator 64, and thus through the tubes 65 and 67 and their branch tubes is provided a line by which the pump is placed in circuit communication with the chambers of all four brakes.

The pump 62 has a shaft 68 which, by means of gears 69, is operatively connected to a countershaft 70. Through a conventional clutch the shaft 70 is adapted to be connected to a driving shaft 71 which may be driven from the transmission of the truck or any rotating part of the engine. That element 72 of the clutch carried by the shaft 70 is movable thereon to engage the clutch element 73 on the shaft 71 by a lever 74 connected to both the clutch element 72 and a thermostat 75 of the diaphragm type. The casing 76 of the diaphragm is connected by a tube 78 to a small receptacle 78ᵃ suitably secured to the member M and containing carbon tetrachloride or any other fluid which varies in pressure with temperature, and which pressure is conveyed to the diaphragm to actuate the latter when reaching a predetermined degree.

In operation, when the water in the brake to which the diaphragm casing is connected, is below a temperature to which the brake is not excessively heated, the clutch is in the disengaged position shown in Fig. 6 to render the pump inactive. However, when the brake temperature rises to a detrimental point, the fluid pressure imposed on the diaphragm rises accordingly to actuate the diaphragm and thus move the clutch to engaged position in which the pump is set into operation to circulate water through all brake chambers and to thereby effect cooling of the brakes. As this cooling is effected, the water is likewise cooled by the radiator. As the fluid is slow in returning to its normal pressure, the diaphragm is likewise slow in returning the clutch to disengaged position. Hence, the pump remains in operation for a limited time after the water is cooled to insure thorough cooling of the brakes before water circulation ceases.

Referring now to Fig. 7, I have here shown my brake applied to one wheel of a two wheeled trailer, and another form of pump operating means. In this embodiment of my invention a pump 80 and a radiator 81 are suitably mounted upon the axle A. The discharge side of the pump is connected by a pipe 82 and branch pipes 83, 83 to the inlet pipes 54ᵃ and 59. The intake side of the pump 80 is connected to the top of the radiator 81 by a pipe 84, while extending from the bottom of the radiator is a pipe 85 connected to the outlet pipes of the brake through branch pipes 86, 86. Thus, the chambers for one brake are placed in circuit communication with the pump and radiator. The chambers of the other brake (not shown) for the other trailer wheel (not shown) may be placed in circuit communication with the pump and radiator by pipes 87 and 88, as will be understood.

The pump 80 is operated by a wheel 89 fixed to the shaft 68 and having frictional contact with the outer periphery of the drum 29. Thus, rotation of the drum actuates the pump to circulate water through both chambers of both brakes to effect cooling of the latter, the water, in turn, being cooled by the radiator as it is circulated therethrough.

I claim:

1. A brake, comprising; a rotatable drum; a non-rotatable support; and a pair of braking members so mounted on said support as to be operable to restrain rotation of the drum, said members having chambers therein with inlets and outlets adapted to permit circulation of a cooling fluid through the chambers and the inlets and outlets for one member extending through and movable in the other member; and means for operating said members.

2. A brake, comprising; a rotatable brake-pressure receiving element; a non-rotatable support; non-rotatable brake-pressure applying members at opposite sides of said element and mounted on said support to move into and out of braking engagement with said element, said members having chambers therein; an inlet and an outlet in each of the members communicating with the respective chambers to permit circulation of a cooling fluid through the chambers; two pipes fixed to one member so as to communicate with the inlet and outlet thereof, and movable through the other member; and operating means for the members.

3. In combination; a wheel brake having chambers therein; a source of water supply; a line placing said water supply in circuit communication with said chambers; a pump in said line; a driving wheel for the pump; a normally inactive clutch for operatively connecting the pump to the driving wheel; and thermostatic means correlated to the line for rendering the clutch active only when the temperature of water in the line exceeds a pre-determined degree.

4. In combination; a plurality of wheel brakes each having chambers therein; a source of water supply; a line for placing said water supply in circuit communication with the chambers of all of said brakes; a pump in said line; a header in said line for evenly distributing water from said pump to said brakes; means for operating said pump; and mechanism for connecting said means to said pump to actuate the latter only when the water temperature in the line exceeds a pre-determined degree.

5. A brake, comprising; a rotatable drum; a brake-pressure receiving element; a connection between said drum and element by which the element is caused to rotate with the drum and yet movable laterally independently of the drum; a non-rotatable support; an outer brake-pressure applying member fixed to said support at the outer side of said element; an inner brake-pressure applying member disposed at the inner side of said element and supported on said outer member for movement axially thereof; both of said members being of annular form, concentric to the support and provided with annular chambers having fluid inlets and outlets; pipes on said inner member communicating with the inlet and outlet thereof and movable through said outer member; springs for urging the outer member free of said element; and means connected to the inner member and extending through the outer member for actuating the inner member to cause both members to have braking engagement with said element.

6. In combination; a wheel brake having chambers therein; a source of water supply; a line placing said water supply in circuit communication with said chambers; a pump in said line; driving means for the pump normally disconnected therefrom; a clutch for connecting the driving means to the pump; and thermo-responsive means for actuating said clutch to effect operation of said pump only when the temperature of water in the line exceeds a predetermined degree and to maintain the pump in operation after the water returns to the predetermined temperature degree to insure cooling of the wheel brake before the pump ceases operation.

7. In combination; a wheel brake having chambers therein and including a drum; a source of water supply; a line placing said water supply in circuit communication with said chambers; a pump in said line; and a driving wheel for the pump contactable with the drum so as to be driven thereby.

BURDICK R. ELLS.